United States Patent
Schmitz et al.

(10) Patent No.: US 12,527,751 B2
(45) Date of Patent: Jan. 20, 2026

(54) ORAL THIN FILM WITH HIGH ACTIVE AGENT LOADING

(71) Applicant: LTS LOHMANN THERAPIE-SYSTEME AG, Andernach (DE)

(72) Inventors: Christoph Schmitz, Rheinbrohl (DE); Markus Müller, Troisdorf (DE); Marius Bauer, Andernach (DE); Michael Linn, Waldböckelheim (DE)

(73) Assignee: LTS LOHMANN THERAPIE-SYSTEME AG, Andernach (DE)

( * ) Notice: Subject to any disclaimer, the term of this patent is extended or adjusted under 35 U.S.C. 154(b) by 528 days.

(21) Appl. No.: 16/770,501

(22) PCT Filed: Dec. 6, 2018

(86) PCT No.: PCT/EP2018/083781
§ 371 (c)(1),
(2) Date: Jun. 5, 2020

(87) PCT Pub. No.: WO2019/110727
PCT Pub. Date: Jun. 13, 2019

(65) Prior Publication Data
US 2020/0383936 A1    Dec. 10, 2020

(30) Foreign Application Priority Data
Dec. 6, 2017   (DE) .................... 10 2017 129 012.5

(51) Int. Cl.
| A61K 31/135 | (2006.01) |
| A61K 9/00 | (2006.01) |
| A61K 9/70 | (2006.01) |
| A61K 47/38 | (2006.01) |

(52) U.S. Cl.
CPC .......... *A61K 31/135* (2013.01); *A61K 9/0056* (2013.01); *A61K 9/7007* (2013.01); *A61K 47/38* (2013.01)

(58) Field of Classification Search
None
See application file for complete search history.

(56) References Cited

U.S. PATENT DOCUMENTS

| 2014/0079740 A1 * | 3/2014 | Salama ............... A61K 31/135 514/647 |
| 2014/0333003 A1 | 11/2014 | Allen et al. |
| 2015/0342947 A1 * | 12/2015 | Pollard ............... A61K 31/135 546/43 |

FOREIGN PATENT DOCUMENTS

| CN | 105997955 A | 10/2016 |
| DE | 102017112527 B4 | 1/2019 |
| WO | 2012167878 A1 | 12/2012 |
| WO | 2014020155 A1 | 2/2014 |
| WO | WO-2016071395 A1 * | 5/2016 ........... A61K 31/573 |

OTHER PUBLICATIONS

Anonymous: "Caffeine: Chemistry, Analysis, Function and Effects (Food and Nutritional Components in Focus)", Aug. 31, 2012, Royal Society of Chemistry Publishing, 3 pages.
Anonymous: "Handbook of Pharmaceutical Excipients", 5th Edition, 2006, 3 pages.
M. Fortez et al.: "Interaction of Dexamethasone and Montmorillonite—Adsorption-Degradation Process", Applied Clay Science, 4 (198) pp. 437-448.
Arora, Loveleen, et al.; "A Review On New Generation Orodispersible Films And Its Novel Approaches", Jan. 20, 2017; Indo American Journal of Pharmaceutical Research, vol. 7, Issue 01. 2017; 20 pages.
Karki, Sandeep, et al.; "Thin Films As An Emerging Platform For Drug Delivery", Apr. 16, 2016; Asian Journal of Pharmaceutical Sciences II; 16 pages.

* cited by examiner

*Primary Examiner* — Melissa S Mercier
(74) *Attorney, Agent, or Firm* — Lippes Mathias LLP

(57) ABSTRACT

The present invention relates to an oral thin film comprising at least one cellulose derivative and at least one pharmaceutically active agent, the at least one pharmaceutically active agent having a water solubility of at most 50 g/L at 20° C. and a pH of 6 to 7 and being contained in the oral thin film in an amount of at least 20 wt. % in relation to the total weight of the oral thin film, and to a method for production of said oral thin film, and use thereof as a medicament.

18 Claims, 2 Drawing Sheets

ORAL THIN FILM WITH HIGH ACTIVE AGENT LOADING

The present invention relates to an oral thin film, a method for production thereof, and use thereof as a medicament.

Oral thin films are thin films containing at least one pharmaceutically active agent that are placed directly in the oral cavity or against the oral mucosa and dissolve there. These films are, in particular, thin active agent-containing polymer-based films which, when applied to a mucous membrane, in particular the oral mucosa, deliver the active agent directly into same. The very good blood supply to the oral mucosa ensures a rapid transfer of the active agent into the bloodstream. This dosage system has the advantage that the active agent is resorbed for the most part by the mucous membrane, thus avoiding the first-pass effect, which occurs in the case of the conventional dosage form of an active agent in tablet form. The active agent may be dissolved, emulsified or dispersed in the film.

Oral thin films known from the prior art have the disadvantage that the disintegration time or oral thin films is all the longer, the greater is the mass per unit area and thus the active agent content of the oral thin film. Depending on the application, however, long disintegration times are undesirable. In addition, known oral thin films have the disadvantage that the maximum mass per unit area and thus the amount of contained pharmaceutically active agent is determined by the drying of the oral thin film during production thereof. The greater is the mass per unit area of the oral thin film, the more pharmaceutically active agent may be contained therein, however the drying time of the oral thin film is extended, as a result, to a time that is no longer economical, and in addition the active agent may be distributed inhomogeneously in the oral thin film.

The aim of the present invention lies in overcoming the above-mentioned disadvantages of the prior art. Especially, the aim of the present invention lies in providing an oral thin film having a relatively high active agent content, i.e. an active agent content of at least approximately 20 wt. % in relation to the total weight of the oral thin film, which oral thin film has a relatively short disintegration time, with the pharmaceutically active agent being distributed relatively homogeneously in the oral thin film. In addition, a further aim of the present invention lies in providing an economically viable method for producing an oral thin film of this kind.

The above aim is addressed by an oral thin film according to claim 1, which comprises at least one cellulose derivative and at least one pharmaceutically active agent, characterised in that the at least one pharmaceutically active agent has a water solubility of at most approximately 50 g/L at 20° C. and a pH of 6 to 7 and is contained in the oral thin film in an amount of at least approximately 20 wt. % in relation to the total weight of the oral thin film.

Especially it has been found that the combination of at least one cellulose derivative with a pharmaceutically active agent in a high concentration significantly accelerates the otherwise relatively long disintegration time of oral thin films based on cellulose derivatives. The water solubility of the at least one pharmaceutically active agent is at most approximately 50 g/L at 20° C. and a pH of 6 to 7.

The oral thin film according to the invention is characterised by a relatively high loading with the at least one pharmaceutically active agent. The amount of the at least one pharmaceutically active agent is at least approximately 20 wt. %, preferably at least approximately 30 wt. %, especially preferably at least approximately 35 wt. %, and very especially preferably at least approximately 40 wt. %, in relation to the total weight of the oral thin film.

A cellulose derivative is understood to mean any natural or synthetic polymer that derives from cellulose or can be obtained by modification of cellulose. Possible modifications comprise methylation, ethylation, hydroxypropylation, sulfonation, nitration, acetylation, oxidation and/or mixtures thereof.

The oral thin film according to the invention is preferably characterised in that the at least one cellulose derivative is contained in the oral thin film in an amount of approximately 5 to 80 wt. %, preferably of approximately 10 to 70 wt. %, especially preferably of approximately 20 to 60 wt. %, in relation to the total weight of the oral thin film.

In a preferred embodiment the oral thin film according to the invention is characterised in that the at least one cellulose derivative comprises a water-soluble and/or water-swellable cellulose derivative.

Water-soluble/water-swellable polymers comprise chemically very different natural or synthetic polymers, the common feature of which is their solubility/swellability in water or aqueous media. A precondition is that these polymers have a number of hydrophilic groups sufficient for the water solubility/water swellability and are not crosslinked. The hydrophilic groups may be non-ionic, anionic, cationic and/or zwitterionic.

The at least one cellulose derivative in the oral thin film according to the invention preferably comprises hydroxypropyl methylcellulose.

In a further preferred embodiment, the at least one cellulose derivative comprises a mixture of two cellulose derivatives having different viscosities, preferably a mixture of two hydroxypropyl methylcelluloses having different viscosities. The oral thin film according to the invention especially preferably comprises a mixture of two hydroxypropyl methylcelluloses, and these preferably have a viscosity of approximately 3 to approximately 50 mPas (measured by USP monograph <911> method 1, from 2012).

The ratio of low-viscosity to high-viscosity cellulose derivative, preferably of low-viscosity hydroxypropyl methylcellulose to high-viscosity hydroxypropyl methylcellulose, is preferably approximately 1:5 to 5:1.

A mixture of a low-viscosity and a high-viscosity cellulose derivative, preferably hydroxypropyl methylcellulose, has the advantage that the solids content and viscosity of the liquid mixture can be set to properties acceptable for the production.

The oral thin film according to the invention is preferably characterised in that the at least one pharmaceutically active agent has a molecular weight of at most approximately 1000 g/mol, preferably of at most approximately 500 g/mol.

Pharmaceutically active agents with a higher molecular weight on the one hand generally have a lower mucosa permeability and are thus disadvantageous.

The at least one pharmaceutically active agent in the oral thin film according to the invention especially preferably comprises ketamine and/or a pharmaceutically acceptable salt thereof, preferably ketamine·HCl. In the present case, ketamine is understood to mean (S)-(±)-2-(2-chlorophenyl)-2-(methylamino)cyclohexan-1-one, (R)-(±)-2-(2-chlorophenyl)-2-(methylamino)cyclohexan-1-one, and the racemate (RS)-(±)-2-(2-chlorophenyl)-2-(methylamino)cyclohexan-1-one.

If the ketamine or a pharmaceutically acceptable salt thereof is present in the form of at least one of the pharmaceutically active agents contained in the oral thin film according to the invention, both (S) ketamine and (R)

ketamine as well as a racemic mixture of the two may be contained in the oral thin film according to the invention. However, (S) ketamine or a pharmaceutically acceptable salt thereof, especially (S) ketamine HCl, is especially preferably present as a single stereoisomer of ketamine, since the analgesic and anaesthetic potency of (S) ketamine is approximately three times higher than that of the (R) form.

The oral thin film according to the invention is preferably characterised in that the oral thin film comprises at least one auxiliary substance selected from the group comprising colouring agents, flavourings, sweeteners, taste-masking agents, emulsifiers, enhancers, pH regulators, humectants, preservatives and/or antioxidants.

Each of these auxiliaries is preferably contained in the oral thin film in each case in an amount of approximately 0.1 to 10 wt. % in relation to the total weight of the oral thin film.

The oral thin film according to the invention is preferably characterised in that the mass per unit area of the oral thin film is approximately 50 to 300 g/m$^2$, preferably approximately 100 to 200 g/m$^2$.

The oral thin film according to the invention especially preferably comprises approximately 40 to 45 wt. %, preferably approximately 41 wt. % of (S) ketamine·HCl, approximately 35 to 40 wt. %, preferably approximately 39.5 wt. %, of a hydroxypropyl methylcellulose with a viscosity of approximately 1 to 5 mPas, preferably of approximately 3 mPas, approximately 5 to 15 wt. %, preferably approximately 10 wt. %, of a hydroxypropyl methylcellulose with a viscosity of approximately 40 to 60 mPas, preferably of approximately 50 mPas, and the usual auxiliaries in an amount of, in each case, approximately 0.1 to 10 wt. %. An oral thin film of this kind preferably has a mass per unit area of approximately 175 g/m$^2$ auf.

In an especially preferred embodiment the oral thin film according to the invention is not a foam.

The present invention also relates to a method for producing the oral thin film described above.

The method comprises the steps of
a) producing an aqueous suspension or solution comprising the at least one cellulose derivative and the at least one pharmaceutically active agent, and
b) spreading and drying the suspension or solution obtained in step a) so that a thin film having a mass per unit area of approximately 50 to 300 g/m$^2$ is obtained, the temperature at which the suspension or solution obtained in step a) is dried being approximately 50° C. to 90° C., preferably approximately 60° C. to 80° C., and especially preferably approximately 70° C.

It has advantageously been found that, by drying the suspension or solution obtained in step a) at approximately 50° C. to 90° C., preferably at approximately 60° C. to 80° C., and especially preferably at approximately 70° C., the at least one pharmaceutically active agent is distributed especially homogeneously in the obtained oral thin film. At lower drying temperatures, on the one hand the solvent cannot be fully removed, and on the other hand an inhomogeneous crystallisation occurs, with a very inhomogeneous distribution pattern of the at least one pharmaceutically active agent, which is undesirable.

The method according to the invention is also characterised in that the at least one cellulose derivative preferably comprises hydroxypropyl methylcellulose.

The method according to the invention is also characterised in that the at least one pharmaceutically active agent comprises ketamine or a pharmaceutically acceptable salt thereof, preferably (S) ketamine or a pharmaceutically acceptable salt thereof.

The present invention also relates to an oral thin film obtainable by the method described above.

In addition, the present invention relates to an oral thin film, as described above or obtainable by the above-described method, as a medicament.

The present invention additionally relates to an oral thin film, as described above or obtainable by the above-described method, as a medicament for use in the treatment of depressions, especially to reduce the risk of suicide and/or for use as a general anaesthetic, preferably to initiate and carry out general anaesthesia, or as a supplement in the case of local anaesthesia and/or as an analgesic.

The preferred embodiments described above for the thin film according to the invention are also applicable for the method according to the invention, the oral thin film obtained thereby, and use of said oral thin film as a medicament.

The invention will be described in greater detail hereinafter on the basis of non-limiting examples.

EXAMPLES

Example 1

|  | Oral thin film according to the invention [wt. %] | Comparative example, [wt. %] |
|---|---|---|
| (S) ketamine | 41.0 | — |
| HPMC 2910 (3 MPas) | 39.5 | 39.5 |
| HPMC 2910 (50 mPas) | 10.0 | 10.0 |
| Glycerol | 3.5 | 3.5 |
| Cherry Flavour M55364 | 3.0 | 3.0 |
| Sucralose | 1.0 | 1.0 |
| Sodium saccharin | 2.0 | 2.0 |
| Solvent | Ultrapure water | Ultrapure water |
| Mass per unit area | 175 g/m$^2$ | 175 g/m$^2$ |
| Disintegration time | 41 seconds | 72 seconds |

In accordance with the method according to the invention, oral thin films having the formulations specified in Table 1 were produced. The disintegration time of the oral thin films was then measured by means of USP method <701> Disintegration, from 2016.

Used apparatus: Disintegration tester DIST 3 with disintegration baskets
Number of strokes per minute: 29-32
Medium: Water
Temperature: 37° C.±2° C.
End-point detection: Visual
End-point: Total disintegration of the film Example 2

An oral thin film was produced in accordance with the formulation according to the invention from Table 1 in accordance with the method according to the invention and was dried at 70° C. For comparison, the same formulation was dried at room temperature (approximately 20° C.).

Figure 1:
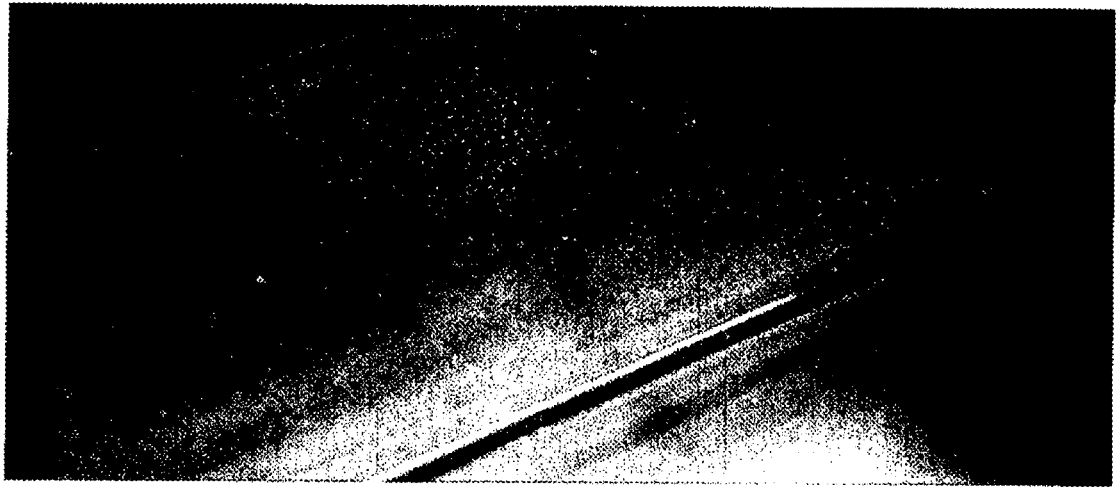
FIG. 1 shows a thin film according to the invention in accordance with the formulation specified in Table 1, directly after the coating.
Figure 2:
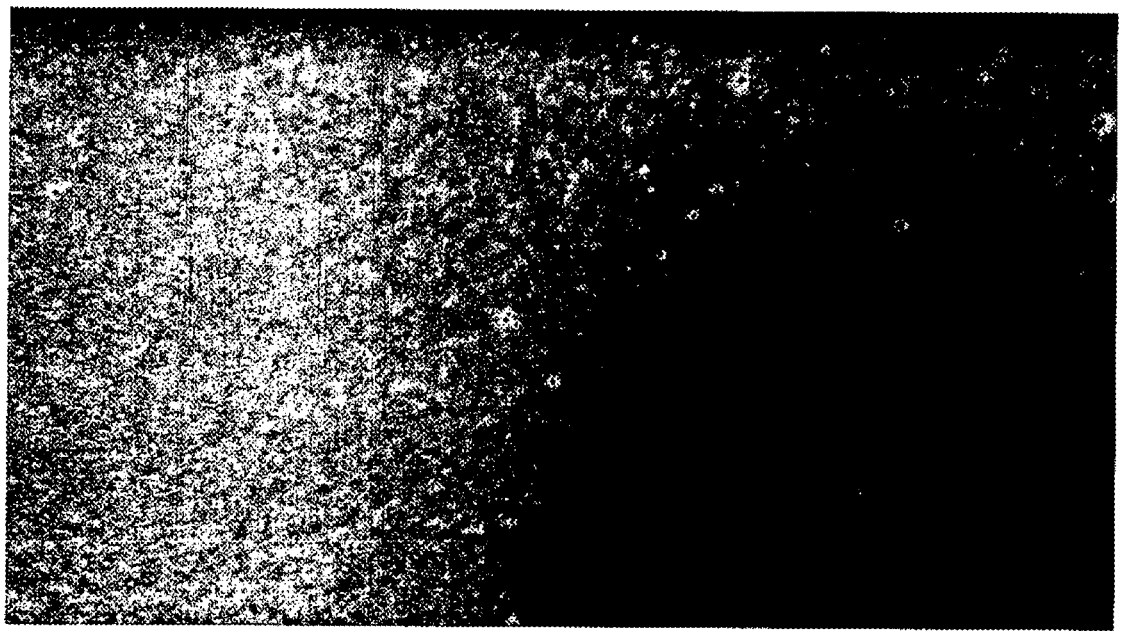
FIG. 2 shows a thin film in accordance with the formulation specified in Table 1, which was dried at room temperature (approximately 20° C.).
Figure 3:
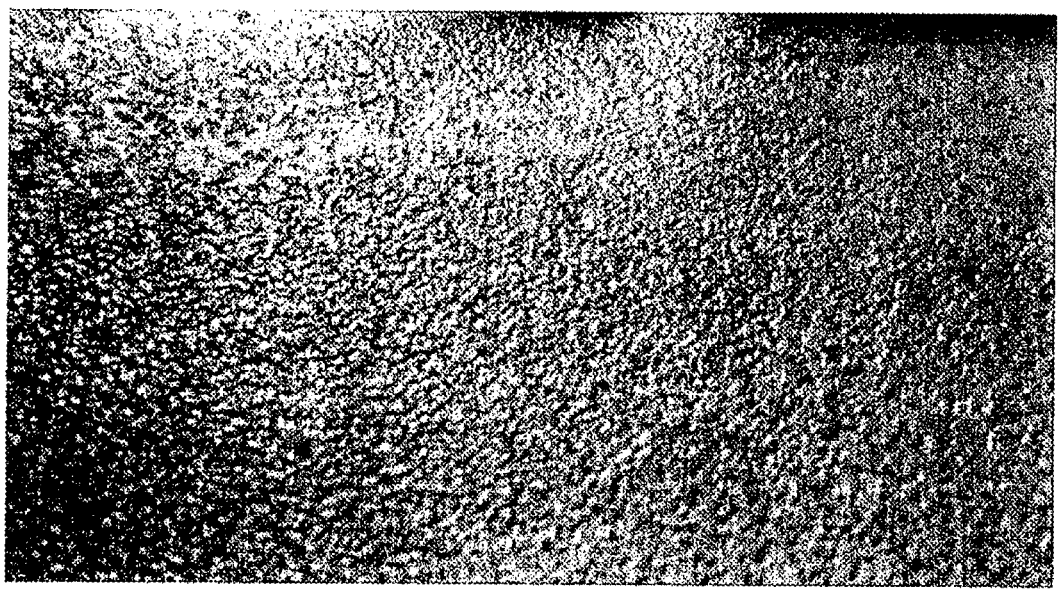
FIG. 3 shows a thin film in accordance with the formulation specified in Table 1, which was dried at approximately 70° C. in accordance with the invention.

The resultant thin films are shown in FIGS. 1 to 3.

FIG. 1 shows the thin film according to the invention in accordance with the formulation specified in Table 1 directly after the coating. The active agent (S) ketamine is present in partially dissolved form or partially particulate form.

FIG. 2 shows a thin film in accordance with the formulation specified in Table 1, which film was dried at room temperature (approximately 20° C.). The active agent (S) ketamine is present in an inhomogeneously crystallised form.

FIG. 3 shows a thin film according to the formulation specified in Table 1, which film was dried at approximately 70° C. in accordance with the invention. The active agent (S) ketamine is present in an extremely homogeneous form.

The invention claimed is:

1. An oral thin film comprising at least one cellulose derivative and at least one pharmaceutically active agent, characterised in that the at least one pharmaceutically active agent comprises ketamine or a pharmaceutically acceptable salt thereof and is contained in the oral thin film in an amount of at least approximately 20 wt. % in relation to the total weight of the oral thin film and wherein the oral thin film has a disintegration time of less than 41 seconds and wherein the at least one cellulose derivative comprises a mixture of two hydroxypropyl methylcelluloses having different viscosities.

2. The oral thin film according to claim 1, characterised in that the at least one cellulose derivative is contained in the oral thin film in an amount of approximately 5 to 80 wt. % in relation to the total weight of the oral thin film.

3. The oral thin film according to claim 1, characterised in that the at least one cellulose derivative comprises a water-soluble and/or water-swellable cellulose derivative.

4. The oral thin film according to claim 1, characterised in that the at least one pharmaceutically active agent has a molecular weight of at most approximately 1000 g/mol.

5. The oral thin film according to claim 1, characterised in that the at least one pharmaceutically active agent comprises (S) ketamine or a pharmaceutically acceptable salt thereof.

6. The oral thin film according to claim 1, characterised in that the oral thin film further comprises at least one auxiliary selected from the group comprising colouring agents, flavourings, sweeteners, taste-masking agents, emulsifiers, enhancers, pH regulators, humectants, preservatives and/or antioxidants.

7. The oral thin film according to claim 1, characterised in that the mass per unit area of the oral thin film is approximately 50 to 300 g/m$^2$.

8. A medicament for reducing a risk of suicide comprising the oral thin film of claim 1.

9. The oral thin film according to claim 1, characterised in that the at least one pharmaceutically active agent has a molecular weight of at most approximately 500 g/mol.

10. The oral thin film according to claim 1 wherein the ratio of a lower viscosity hydroxypropyl methylcellulose to a higher viscosity hydroxypropyl methylcellulose is approximately 1:5 to 5:1.

11. The oral thin film according to claim 1 wherein the pharmaceutically active agent is contained in an amount of at least 40 wt. %.

12. The oral thin film according to claim 1 wherein the at least one cellulose derivative is contained in the oral thin film in an amount of approximately 20 to 60 wt. %.

13. The oral thin film according to claim 6 wherein the auxiliary is contained in the oral thin film in an amount of approximately 0.1 to 10 wt. %.

14. The oral thin film according to claim 1 wherein the at least one hydroxypropyl methylcellulose has a viscosity of approximately 1 to 5 mPas.

15. The oral thin film according to claim 14 wherein the other at least one hydroxypropyl methylcellulose has a viscosity of approximately 40 to 60 mPas.

16. The oral thin film according to claim 15 wherein the at least one hydroxypropyl methylcellulose comprises about 35 to 40 wt. %.

17. The oral thin film according to claim 16 wherein the other at least one hydroxypropyl methylcellulose comprises about 5 to 15 wt. %.

18. The oral thin film according to claim 17 including about 40 to 45 wt. %. (S) Ketamine.

* * * * *